Dec. 15, 1925.  
A. W. BURKE  
1,565,546  
MOTOR STARTER AND CIRCUIT CONTROLLER  
Filed Aug. 13, 1921    2 Sheets-Sheet 1
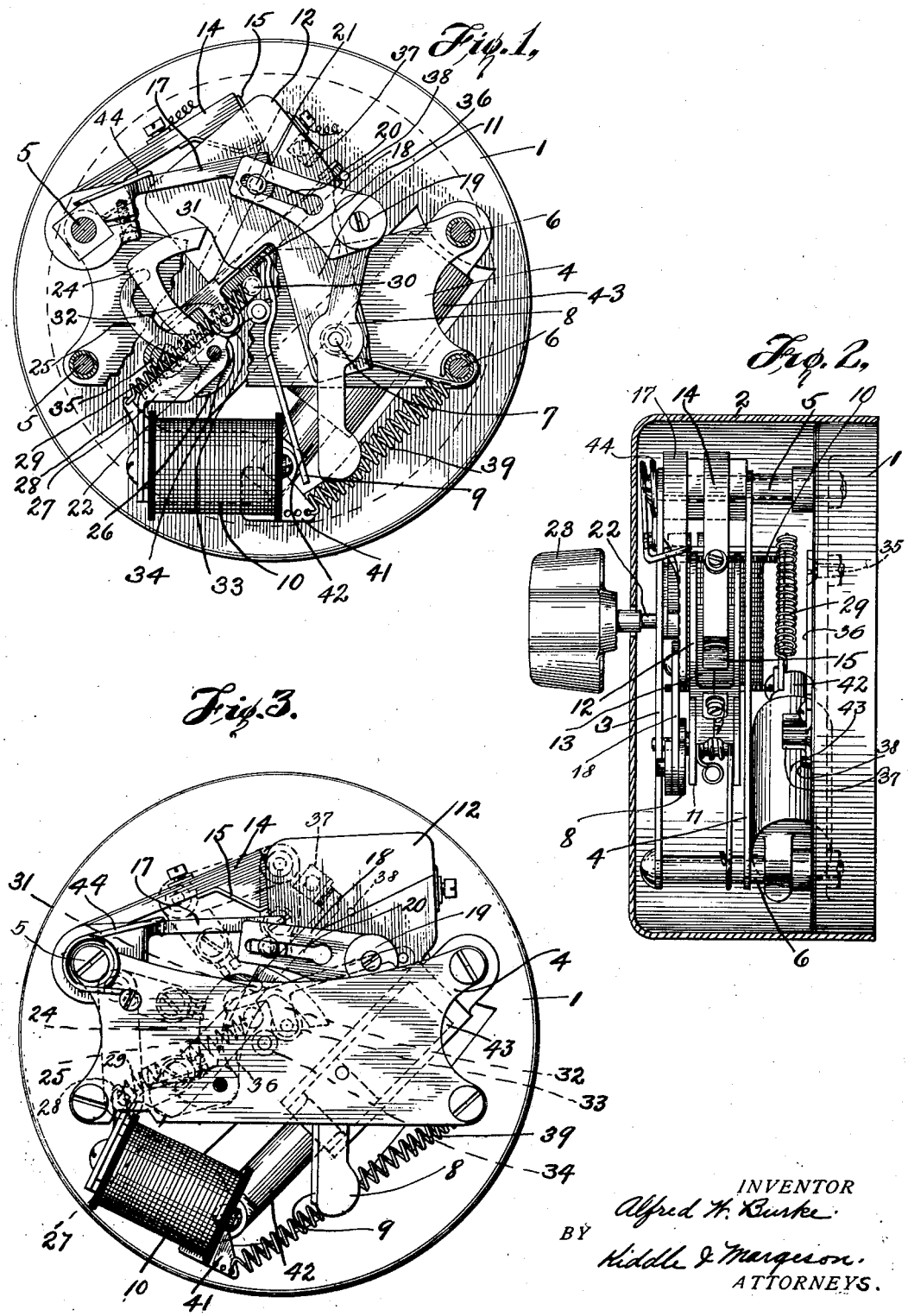
INVENTOR  
Alfred W. Burke  
BY  
Kiddle & Margeson  
ATTORNEYS.

Dec. 15, 1925.
A. W. BURKE
1,565,546
MOTOR STARTER AND CIRCUIT CONTROLLER
Filed Aug. 13, 1921     2 Sheets-Sheet 2
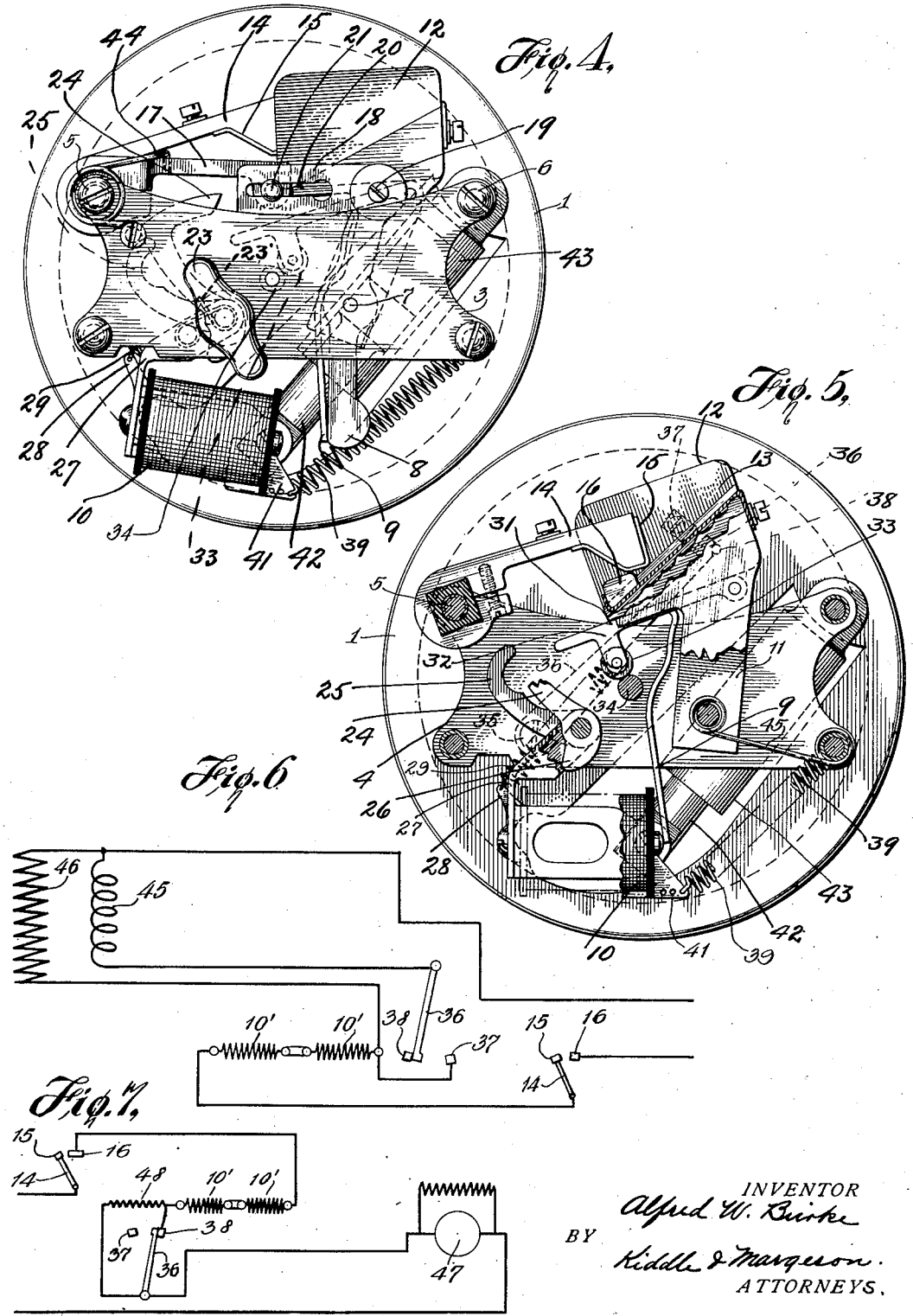

Patented Dec. 15, 1925.

1,565,546

UNITED STATES PATENT OFFICE.

ALFRED W. BURKE, OF PELHAM MANOR, NEW YORK.

MOTOR STARTER AND CIRCUIT CONTROLLER.

Application filed August 13, 1921. Serial No. 491,906.

*To all whom it may concern:*

Be it known that I, ALFRED W. BURKE, a subject of the King of Great Britain, and a resident of Pelham Manor, county of Westchester, and State of New York, have invented certain new and useful Improvements in Motor Starters and Circuit Controllers, of which the following is a specification.

My invention relates to what may very properly be termed a combined motor starter and circuit controller and an object of my invention is the provision of a device which may be employed to great advantage in starting an electric motor, the device functioning automatically to open the motor circuit under abnormal conditions, as an over-load, for example.

The present device is well adapted for use in connection with split phase, as well as direct current motors, and when used with split phase motors is capable of being substituted for the usual centrifugal switch employed in connection with such motors. In this connection it may be well to note that my improved device possesses many practical advantages in that the ordinary centrifugal switch employed in connection with split phase motors is built directly into the motor and hence is not accessible for inspection, repairs, etc., whereas the present device which does not rely upon centrifugal force for operation, is mounted entirely outside of the motor and hence is accessible at all times for inspection, repairs, replacements, or any other purpose desired.

As another advantage in connection with the use of my device as applied to split phase motors, I may mention that after the starting or auxiliary winding has been cut out of circuit by opening the starting switch, the circuit of this winding cannot be re-established until the main circuit has been opened by opening the running switch.

Briefly, my invention comprises a device in which I have embodied two switches, one of which for convenience I shall term the starting switch and the other of which I shall term the running switch.

In employing this device in connection with split phase motors the starting switch, of course, controls the usual starting winding of the motor while the running switch controls the running winding. When my device is employed with direct current motors one of these switches is arranged so as to close the circuit to the motor through the usual starting resistance, this resistance being short-circuited within a predetermined time after the other switch has closed.

In the case of split phase motors the circuit to the starting winding is not completed although the starting switch is closed, until the running switch is closed.

The centrifugal switches ordinarily employed with split phase motors possess certain disadvantages which it is an object of this invention to overcome or eliminate: For example, in using the ordinary centrifugal switch in connection with split phase motors it is quite possible that due to heavy load conditions the motor will not come up to sufficient speed to cause the centrifugal switch to function with the result that the motor may drag sufficiently to burn out the starting winding. In the present construction, however, centrifugal force is not relied upon at all for the operation of my improved switch and hence these conditions cannot arise.

In using the usual centrifugal starting switch, the starting winding, as above noted, is in circuit both at starting and whenever the motor is sufficiently loaded for the speed to drop down to a point where the centrifugal switch will again close. In the present apparatus, however, as distinguished from this, the starting switch after it has once opened cannot be closed again unless the running switch is first of all opened.

Viewing my invention from another angle, the starting winding when my device is employed is in circuit during the starting operation only, it being necessary to disconnect the motor from the line before it is again possible to energize both windings. With the centrifugal type of switch it is common practice to have an attendant at the motor when the motor is started so that should the motor fail to start for any reason the attendant may disconnect it but after the motor is running there is usually no attendant present, with the result that should the motor stall due to overload or low voltage, the starting winding will again cut in and may burn out. With my improved switch, however, the arrangement is such that it is impossible for the starting and running switches to remain in circuit at the same time except momentarily, the starting switch opening automatically within a predetermined period and in case of over-load the running switch will be opened automatically whether an attendant be present or not.

In the accompanying drawings wherein an embodiment of my improved starting and controlling device has been illustrated—

Fig. 1 shows the apparatus in side elevation with all the parts in neutral position;

Fig. 2 is a plan view of the apparatus of Fig. 1 with the box in which the apparatus is enclosed shown in section;

Fig. 3 is an elevation showing the parts moved to a position where the starting switch is closed;

Fig. 4 shows the main switch closed;

Fig. 5 shows the parts in position after the apparatus has been automatically tripped so as to open the motor circuit;

Fig. 6 is a wiring diagram showing the application of my improved device to a split phase motor; and Fig. 7 is a wiring diagram showing the application of my device to a direct current motor.

Referring to the drawings in detail,—1 designates a base to which the entire apparatus is secured, the apparatus as a whole, with the exception of the operating key, being enclosed in a box 2. From an inspection of Figs. 1 and 2 for example it will be seen that 3 and 4 designate a pair of plates, these plates being spaced apart upon studs 5 and 6 mounted in the base 1. Pivotally mounted upon a stud 7 and between the plates 3 and 4 is a manually operable tripping lever 8, the lower end of which is adapted to be moved into engagement with the lower end of an armature 9 of an electromagnet 10, as will be described in detail hereinafter.

Upon the stud 7 I pivot also an extension 11 of a running contact block 12, this block being provided with a slot 13 (see Fig. 2). This receives a running switch arm 14 carrying a running contact 15, this contact as will be pointed out presently, being adapted to engage a contact 16 carried in the bottom of the slot 13 already referred to in the block 12.

The running switch arm 14 is pivoted on the stud 5 and is rigid with one arm 17 of a toggle mechanism provided for the purpose of enabling the running switch to be manually opened. This toggle comprises the arms 17 and 18, the latter being pivoted at the upper end of the tripping lever 8 as indicated at 19. In the arm 18 I provide a longitudinally-extending slot 20 which receives a pin 21 carried by the toggle arm 17. Mounted upon the stud 22 carrying the operating key 23 are a pair of arms 24 and 25. The arm 24 may be termed the toggle operating arm and is rigid with the arm 25 which I will term a block operating arm. The block operating arm 25 is provided for the purpose of actuating the contact block 12 about its pivot 7. The block operating lever 25 is provided with a tail 26 adapted to cooperate with a bracket 27 by which the magnet 10 is supported, this bracket being pivoted so that the magnet 10 may be moved from the position shown in Fig. 1 to the position shown in Fig. 3 for example. The magnet supporting bracket 27 is provided with an offset 28 secured to which is one end of a coil spring 29, the other end of this spring being fastened to a stud 30.

The contact carrying block 12 has pivotally secured to it one end of a locking lever 31. This locking lever which cooperates with the block operating lever 25 already referred to is provided adjacent one end with an offset 32 carrying a locking roller 33 cooperating with a roller 34 mounted on a fixed stud.

A pivot 35 carries a starting switch arm 36 adapted to cooperate with the starting contact 37, this starting switch arm carrying the pivot 30 already referred to, to which the spring 29 is connected. The starting switch is operated to closed position and to open position by the action of the coil spring 29 as will be presently described, this spring always being in tension. Movement of the starting switch to open position is limited by a contact 38.

The locking lever 31 has secured to it one end of the armature 9 for the electromagnet 10. The electromagnet after being moved to the position shown in Fig. 3 for example is returned to the position shown in Fig. 1 by a coil spring 39, one end of which is secured to the frame 1, the other end being secured to a bracket 41 carried by the electromagnet 10, this bracket having attached to it also a plunger 42 of a dash pot 43, the chamber of which is pivoted on the stud 6.

Having described the details of my improved apparatus I will now describe a cycle of operation thereof without reference, first of all, however, to the wiring diagram of Figs. 6 and 7.

Starting with the parts in the position shown in Fig. 1, the operating key which, it will be remembered, is fastened to the stud 22, is first of all turned in a clockwise direction, as viewed in Fig. 1. This movement of the key will actuate the tripping lever 24 and contact block operating lever 25 to the right as viewed in said figure, the lever 24 riding beneath the toggle lever 18 as shown in dotted lines in Fig. 3. At the same time the contact block operating lever 25 will carry the locking lever 31 to the right, swinging the contact carrying block 12 about its pivot 7 in a clockwise direction. This movement is continued until the parts have reached the dotted line position of Fig. 3 and from which figure it will be noticed the locking roller 33 has been carried past the center of the roller 34 so as to be locked behind said roller. This movement of the key, by reason of the tail 26 engaging the bracket 27, also causes the electromagnet 10 to be carried to the left from the position shown in Fig. 1 to the position shown in Fig. 3 against the action of the spring 39, drawing the plunger 42 of the dash pot outwardly. Shortly after the beginning of the movement of the electromagnet 10 to the left the spring 29 secured thereto will pass above the center of the pivot 35 of the starting switch 36 and inasmuch as this spring is under tension it will snap the starting switch to a closed position into engagement with the contact 37. At this time the running switch arm 14 has not been moved to closed position, being still held open by the toggle arm 18.

With the parts in the position shown in Fig. 3 the key 23 is released and its spring 23' causes it to begin its return journey to its original position, carrying the levers 24 and 25 to the dotted line position of Fig. 4. As soon as the lever 24 moves out from beneath the toggle arm 18 the toggle is moved downwardly under the action of the spring 44 carrying with it the running switch arm 14 until the running contact 15 carried by this arm engages the contact 16 on the block 12.

It will be seen, therefore, that although the key 23 has begun its return journey, the starting switch 36 has not yet opened the switch, still being held closed by the spring 29 which it will be remembered is operatively attached to the bracket 27. At this time, therefore, both switches are closed. However, the spring 39 attached to the electromagnet is exerting a pull on the electromagnet against the action of the dash pot 43 and the electromagnet, together with the bracket 27 will therefore be moved from the position shown in Fig. 3 to the position shown in Fig. 1 in time reaching the position shown in the last-named figure. As soon, however, as the electromagnet has moved far enough to carry the spring 29 below the pivotal point of said switch the switch will be snapped to open position.

In order that the application of my improved starting and controlling apparatus to a motor may be understood I shall now proceed to describe its operation in connection with the split phase wiring diagram of Fig. 6. In this diagram 45 designates a starting winding and 46 a running winding of a split phase motor. 10'—10' designate the windings of the electromagnet 10.

Assuming that the parts of the starting and controlling device are in the position shown in Fig. 1, the windings 45, 46 and 10'—10' are all open-circuited. If now, the key 23 be operated as above described, that is to say, in a clockwise direction as viewed in Fig. 1, the contact carried by the starting switch arm 36 will be moved into engagement with the starting contact 37, the winding 45 still being open circuited and as soon as the key 23 moves in a reverse direction far enough to carry the lever 24 from beneath the toggle arm 17, the running switch 14 will be moved downwardly under the action of the spring 44, carrying the running contact 15 into engagement with the contact 16. The circuit to the starting winding 45 and the running winding 46 is now closed as well as the circuit to the windings 10'—10' of the electromagnet 10. Within a predetermined period, however, that is when the spring 39 has carried the spring 29 below the pivoted point of the switch arm 36, the starting switch will be opened as I have above described, with the result that the starting winding is open-circuited. This is true whether the motor starts or not. Should the motor fail to start, due to over-load, for example, or for some other reason, the electromagnet 10 will actuate its armature 9. In this event, of course, as I have above pointed out, the running switch will be opened at the contacts 15 and 16 to open-circuit the running winding 46. As I have also above pointed out, it is impossible for the starting switch to be closed after it has once been opened unless and until the running switch has first been opened. Hence it will be seen that I have provided an apparatus adapted for use in connection with split phase motors wherein initially the starting winding and running winding are both energized, the starting winding being open-circuited within a predetermined period after its circuit has been made, means having been provided whereby the circuit of the starting winding cannot be again closed until the circuit to the running winding has been opened. This, of course, is of great advantage as compared to the usual centrifugal switch for controlling the starting and winding of split phase motors for with such a switch the circuit to the starting winding may never open as in the case of over-load on the motor and may close at any time the motor slows down sufficiently and while the circuit to the running winding is closed.

The main switch will now remain closed until it is opened either manually or automatically, the automatic opening of the main switch being accomplished by an increase in the flow of current in the electromagnet due to over-load for example, which will cause the electromagnet to attract its armature 9, drawing the same to the left. Inasmuch as the armature 9 is secured to the locking lever 31, movement of this armature to the left will cause the locking lever to be rocked about its pivot to raise the roller 33 above the hub 26, permitting the spring 44 carried by the extension 11 of the contact carrying block 12 to function to cause the contact carrying block 12 to be rocked about its pivot to open the running switch arm 14 to open position.

It will be seen that now both the starting switch and the running switch are open. It may be desirable, of course, to open the running switch manually instead of automatically, and this may readily be accomplished by merely actuating the key 23 in a clockwise direction, which will bring the end of the tripping lever 24 into engagement with the end of the toggle arm 18 which, it will be assumed, is in the position shown in Fig. 4. Continued movement of the key 23 in a clockwise direction will, of course, carry the toggle lever 18 to the right, this movement of the toggle arm with respect to the arm 17 being permitted by reason of the slot 20. The toggle arm 18 will now cause the tripping lever 8 to be rocked about its pivot so as to carry the lower end of this tripping lever to the left into engagement with the armature 9 to cause the latter to move in the same direction as though it had been actuated by the electromagnet 10.

In Fig. 7 I have illustrated a wiring diagram for a direct current motor 47 wherein my apparatus may be employed. When employing my device with a direct current motor the contact 38 is connected to the mains instead of the contact 37. From Fig. 7 it will be seen that when the key 23 is actuated in a clockwise direction and before the starting switch 36 has been actuated to closed position,—it being remembered now that closed position in connection with the direct current motor is when the switch 36 contacts with the contact 38,—the main switch 14 will be closed. A circuit is now closed to the motor 47 through the windings 10'—10' of the electromagnet 10 and starting resistance 48. As soon, however, as the key 23 is released and the spring 39 actuates the starting switch 36 into contact with the contact 38, the starting resistance 48 will be short-circuited.

The motor will continue to run with the switches 36 and 16 closed and the starting resistance 48 cut out as long as may be desired or until some abnormal condition arises, so as to cause the electromagnet 10 to actuate its armature 9. In this event the switch 14 will be open and may not again be closed until the starting switch 36 has been opened.

Here, then, it will be seen that with the parts in neutral position the switch 36 is in engagement with the contact 38 and the switch 14 in open position;—in other words, the switches are in the position shown in Fig. 7. When the key 23 is actuated the switch 36 will be moved away from the contact 38 and soon thereafter the running switch 14 will be closed, the reverse movement of the key 23 causing the switch 36 to be returned to its initial position, that is to say into engagement with the contact 38 to cut out the starting resistance 48.

It will be seen from the foregoing that I have provided an apparatus wherein two switches are provided, one of which has been termed a starting switch and the other a running switch.

It will be seen furthermore that the starting switch is first of all closed although no circuit is established and that on further operation the running switch is closed, the starting switch thereafter within a predetermined period being automatically opened.

The running switch will remain closed until the electromagnet 10 actuates its armature or until the running switch has been manually opened by movement of the key 23 in the manner above described.

It will be seen furthermore that I have provided an apparatus wherein it is impossible to again close the starting switch after the same has been opened unless the running switch 14 has first of all been opened, for the reason that in order that the starting switch may be again closed it becomes necessary for the tail 26 of the lever 25 to be actuated to carry the spring 29 above the center of the pivot of the starting switch but owing to the position of the toggle arms 17 and 18 after the starting switch has once been opened and the running switch closed, this movement of the lever 25 will also carry the lever 24 into engagement with the toggle arm 18 to open the running switch.

It will be seen furthermore that I have provided mechanism whereby the running switch may be opened automatically due to an increase in current in the electromagnet 10 and whereby the running switch may be opened manually at any time desired.

In connection with the application of my device to split phase motors, it will be seen that although the starting switch closes first it is not until the running switch has closed that the circuit is made to the starting winding, and that within a predetermined period the starting winding is open-circuited. In other words, means have been provided whereby the circuit to the starting winding may not remain closed beyond a predetermined period.

It will be seen also that in connection with direct current motors the starting resistance is automatically short-circuited within a predetermined period and the circuit through the starting resistance may not be again closed until the main switch opens.

It is to be understood that changes in the details of construction of my apparatus may be made by those skilled in the art within the purview of my invention.

The details of the specific switch above described in connection with the control of the circuits also above described constitute the subject matter of a divisional application Serial No. 56,429 filed September 15th, 1925.

What I claim is:

A split phase motor comprising in combination a starting winding, a running winding, means for closing a circuit to said windings comprising a starting switch and a running switch, means for closing said starting switch and said running switch, means for opening the starting switch while the running switch remains closed, means for preventing a second closing of the starting switch until the running switch has been opened and an electromagnet in circuit with the running winding and operative to automatically open said running switch.

This specification signed this 10th day of August, 1921.

ALFRED W. BURKE.